US012811031B2

(12) United States Patent
Brown et al.

(10) Patent No.: US 12,811,031 B2
(45) Date of Patent: Nov. 24, 2026

(54) DATA TRANSMISSION CABLE

(71) Applicant: PRYSMIAN S.p.A, Milan (IT)

(72) Inventors: Scott M. Brown, Cincinnati, OH (US); Christian Pfeiler, Nuremberg (DE)

(73) Assignee: PRYSMIAN S.P.A., Milan (IT)

( * ) Notice: Subject to any disclaimer, the term of this patent is extended or adjusted under 35 U.S.C. 154(b) by 386 days.

(21) Appl. No.: 18/319,271

(22) Filed: May 17, 2023

(65) Prior Publication Data

US 2023/0378625 A1 Nov. 23, 2023

(30) Foreign Application Priority Data

May 20, 2022 (IT) ........................ 102022000010544

(51) Int. Cl.

| | |
|---|---|
| ***H01B 11/08*** | (2006.01) |
| ***H01B 11/00*** | (2006.01) |
| ***H01B 11/20*** | (2006.01) |
| ***H04L 25/02*** | (2006.01) |

(52) U.S. Cl.

CPC ........... *H01B 11/08* (2013.01); *H01B 11/005* (2013.01); *H01B 11/20* (2013.01); *H04L 25/0272* (2013.01); *H04L 25/028* (2013.01)

(58) Field of Classification Search

CPC ... H01B 7/02; H01B 7/04; H01B 7/06; H01B 7/08; H01B 7/10; H01B 7/12; H01B 11/005; H01B 11/002; H01B 11/02; H01B 11/04; H01B 11/06; H01B 11/08; H01B 11/12; H01B 11/18; H01B 11/1891; H01B 11/20; H01R 13/6592

USPC ......................... 174/102 R, 103, 104, 105 R, 174/110 R–113 R, 117 R–131 A

See application file for complete search history.

(56) References Cited

U.S. PATENT DOCUMENTS

| | | | | |
|---|---|---|---|---|
| 1,976,847 A * | 10/1934 | Gordon | H01B 11/002 | 174/113 C |
| 5,424,491 A | 6/1995 | Walling et al. | | |
| 6,010,788 A * | 1/2000 | Kebabjian | H01B 11/002 | 174/105 R |
| 6,194,663 B1 | 2/2001 | Friesen et al. | | |
| 6,288,340 B1 * | 9/2001 | Arnould | H01B 13/2673 | 174/113 R |
| 6,506,976 B1 * | 1/2003 | Neveux, Jr. | H01B 11/06 | 174/113 C |
| 6,624,359 B2 * | 9/2003 | Bahlmann | H01B 11/085 | 174/117 FF |
| 7,214,883 B2 * | 5/2007 | Leyendecker | H01B 11/002 | 174/113 R |

(Continued)

FOREIGN PATENT DOCUMENTS

| | | |
|---|---|---|
| CN | 106169677 A | 11/2016 |
| EP | 0915486 A1 | 5/1999 |

(Continued)

*Primary Examiner* — William H. Mayo, III

(74) *Attorney, Agent, or Firm* — Seed IP Law Group LLP

(57) ABSTRACT

A data transmission cable includes a first balanced untwisted cable pair including a first insulated conductor and a second insulated conductor. The data transmission cable also includes at least one second balanced untwisted cable pair including a third insulated and a fourth insulated conductor. A metallic screen separates and at least partially surrounds each of said first, second, third and fourth insulated conductor.

10 Claims, 3 Drawing Sheets

(56) References Cited

U.S. PATENT DOCUMENTS

| | | | | |
|---|---|---|---|---|
| 7,999,184 | B2 * | 8/2011 | Wiebelhaus | H01B 11/06 174/113 C |
| 9,355,759 | B2 * | 5/2016 | Rivernider | H01B 13/0278 |
| 9,418,775 | B2 * | 8/2016 | Wessels, Jr. | H01B 11/002 |
| 9,728,904 | B2 * | 8/2017 | Yamada | H01B 11/12 |
| 10,347,397 | B2 | 7/2019 | Armbrecht et al. | |
| 2003/0121695 | A1 * | 7/2003 | Wiebelhaus | H01B 11/04 174/116 |
| 2004/0035603 | A1 * | 2/2004 | Clark | H01B 11/1091 174/113 R |

FOREIGN PATENT DOCUMENTS

| | | | |
|---|---|---|---|
| JP | 2003045240 | A | 2/2003 |
| KR | 10-2018-0077334 | A | 7/2018 |

* cited by examiner

DATA TRANSMISSION CABLE

BACKGROUND

Technical Field

The present disclosure relates to data transmission cables, such as an ethernet cables.

Description of the Related Art

Known ethernet cables are designed with balanced twisted pairs (e.g., four twisted pairs) and are classified into categories based mainly on bandwidth (measured in MHz), maximum data rate (measured in megabits per second) and as screened/unscreened.

As an example, a Category 5 (Cat5) cable has a data rate of up to 100 Mbps. Cat5 cable is used for standard 10 BaseT and 100 BaseT (fast ethernet) networks, and can distribute data, video and telephone signals at distances up to 100 meters.

In comparison to Cat5 cable, a Cat6 cable provides greater bandwidth and data transfer rates up to 1 Gbps over 100 m. However, at shorter distances of up to 37 m, Cat6 is able to achieve 10 Gbps speeds thanks to its improved shielding and higher bandwidth. Cat6 may often include a physical separator called a "spline" between the four pairs to reduce crosstalk and foil shielding to reduce electromagnetic interference.

With a bandwidth of up to 2 GHz and a data rate of up to 40 Gbs, cable of Category 8 (Cat8) is employed for switch-to-switch communications in a 25 GBase T or 40 GBase T network. It is observed that Cat8 cables have a maximum reach (30 m) significantly reduced with respect lower category cables.

Document U.S. Pat. No. 6,288,340 discloses an electrical conductor cable for transmitting information including a set of conductors or pairs of conductors insulated from each other and at least two metalized longitudinal flexible tapes separating the conductors or pairs and applied around each conductor or pair by virtue of twisting or torsion of the cable.

Document U.S. Pat. No. 10,347,397 relates to a cable for transmitting electrical signals comprising an outer casing made of an electrically insulating material and at least two lines arranged within the outer casing, wherein each line as at least one wire made of an electrically conductive material. The dielectrics of the wires of one line have a value for the relative permittivity of the dielectrics surrounding the respective wires differing by a quantity between 0.01 to 2.0 in comparison with the wires of a different line. This results in different propagation speeds for electrical signals on these lines with different dielectrics around the wires. The cable is a star quad cable, in which the four wires of the two lines (two wires per line) are twisted with one another in a cruciform manner.

Document U.S. Pat. No. 5,424,491 discloses a telecommunications cable having a plurality of pairs of twisted together individually insulated conductors, the twist lay length of at least some conductor pairs being different from that of others, and the insulation thickness of the conductors of at least some pairs being different from that of other pairs.

At present, the majority, if not all of the marketed ethernet cables use balanced lines (or signal pairs) each consisting of two conductors of the same type, each of which having equal impedances along their lengths and equal impedances to ground and to other circuits to reduce noise and interference as much as possible. See, for example, https://en.wikipedia.org/wiki/Balanced_line and C. R. Paul, Analysis of Multiconductor Transmission Lines, 2$^{nd}$ Ed. IEEE Press, 2008, Chap. 1.5.2.

Common mode parameters have been considered to improve the transmission parameters. See, for example, Kaden, H.: "*Wirbelströme und Schirmung in der Nachrichten-technik*"; Springer-Verlag, chapter E-2, 1959, and Pfeiler, C.; Molin, D.: Calculation of common mode parameters of cables for high data rate digital communications; Proceeding of the 64th IWCS; p. 505 to 508. However, the Applicant noticed that Cat8 cables typically show distortion effects of the transmission parameters that do not allow using the common mode, in addition to the differential mode, for high speed data transmission.

BRIEF SUMMARY

The Applicant recognizes that in data transmission cables a further increase of data rate, with respect to the values obtainable with the known cables (e.g., Cat8 cables) but avoiding further decrease of the maximum reach, is appealing.

The Applicant has invented a data transmission cable comprising at least two pairs of insulated conductors, the insulated conductors of a pair being untwisted one another, and including a metallic screen wrapped around each insulated conductor, has increased data rate and limited crosstalk effects. Said data transmission cable allows efficiently operating in common mode in addition to balanced (a.k.a. differential) mode.

Thus, the present disclosure relates to a data transmission cable comprising:

a first balanced untwisted cable pair including a first insulated conductor comprising a first conductor surrounded by a first insulation layer, and a second insulated conductor comprising a second conductor surrounded by a second in insulation layer;

at least one second balanced untwisted cable pair including a third insulated conductor comprising a third conductor surrounded by a third insulation layer, and a fourth insulated conductor comprising a fourth conductor surrounded by a fourth insulation layer;

wherein:

the cable further comprises a metallic screen separating and at least partially surrounding each of said first, second, third and fourth insulated conductor; and the first balanced untwisted cable pair is configured to be unbalanced with respect to the second balanced untwisted cable pair.

In an embodiment, the first balanced untwisted cable pair is associated with a first group of structural parameters and the second balanced cable pair is associated with a second group of structural parameters different from the first group of structural parameters in at least one value.

In an embodiment, the first group of parameters includes: a first external diameter of the first and second insulated conductor; a first inner diameter of the first and second insulated conductor and a first dielectric constant of the first and second insulation layers. The second group of parameters includes: a second external diameter of the third and fourth insulated conductor; a second inner diameter of the third and fourth insulated conductor and a second dielectric constant of the third and fourth insulation layers.

The first group of parameters, the second group of parameters and the metallic screen are suitable to reduce crosstalk between the first cable pair and the at least one second cable pair.

In an embodiment, the insulated conductors of the present data transmission cable, while being untwisted each other in a pair, are stranded altogether. For example, while the first and the second insulated conductors are untwisted with respect to each other, they are stranded with the third and the fourth insulated conductor.

The data transmission cable of the present disclosure further includes an outer sheath surrounding the first pair, the at least one second pair and the metallic screen.

In an embodiment, the metallic screen may comprise at least one metallic foil. When the metallic screen comprises two or more metallic foils, these foils can be partially radially superposed.

In an embodiment, the foil/s of the metallic screen is/are made of a material selected from copper, aluminium, or alloys thereof.

In an embodiment, a further metallic screen may be present between the metallic screen and the outer sheath.

In an embodiment, the data transmission cable of the present disclosure is configured to operate according to an ethernet protocol. The data transmission cable of the present disclosure can be configured to operate according to a high data rate protocols, for example higher than 10 Gbit/s or higher than 40 Gbit/s.

The present disclosure also relates to a data transmission system comprising a data transmission cable comprising:

- a first balanced untwisted cable pair including a first insulated conductor comprising a first conductor surrounded by a first insulation layer, and a second insulated conductor comprising a second conductor surrounded by a second in insulation layer;
- at least one second balanced untwisted cable pair including a third insulated conductor comprising a third conductor surrounded by a third insulation layer, and a fourth insulated conductor comprising a fourth conductor surrounded by a fourth insulation layer;

wherein:

the cable further comprises a metallic screen separating and at least partially surrounding each of said first, second, third and fourth insulated conductor; and the first balanced cable pair is configured to be unbalanced with respect to the second balanced cable pair; and a communication device connected to said data transmission cable to generate and transmit along the data transmission cable data signals both in common and differential mode simultaneously.

In the present description and claims the term “insulation”, “insulated” and the like, and “conductive”, “conductor” and the like are meant to refer to electrically insulating and electrically conducting entities.

BRIEF DESCRIPTION OF THE DRAWINGS

Further characteristics and advantages will be more apparent from the following description of the various embodiments given as a way of an example with reference to the enclosed drawings in which.

DETAILED DESCRIPTION

Figure 1:
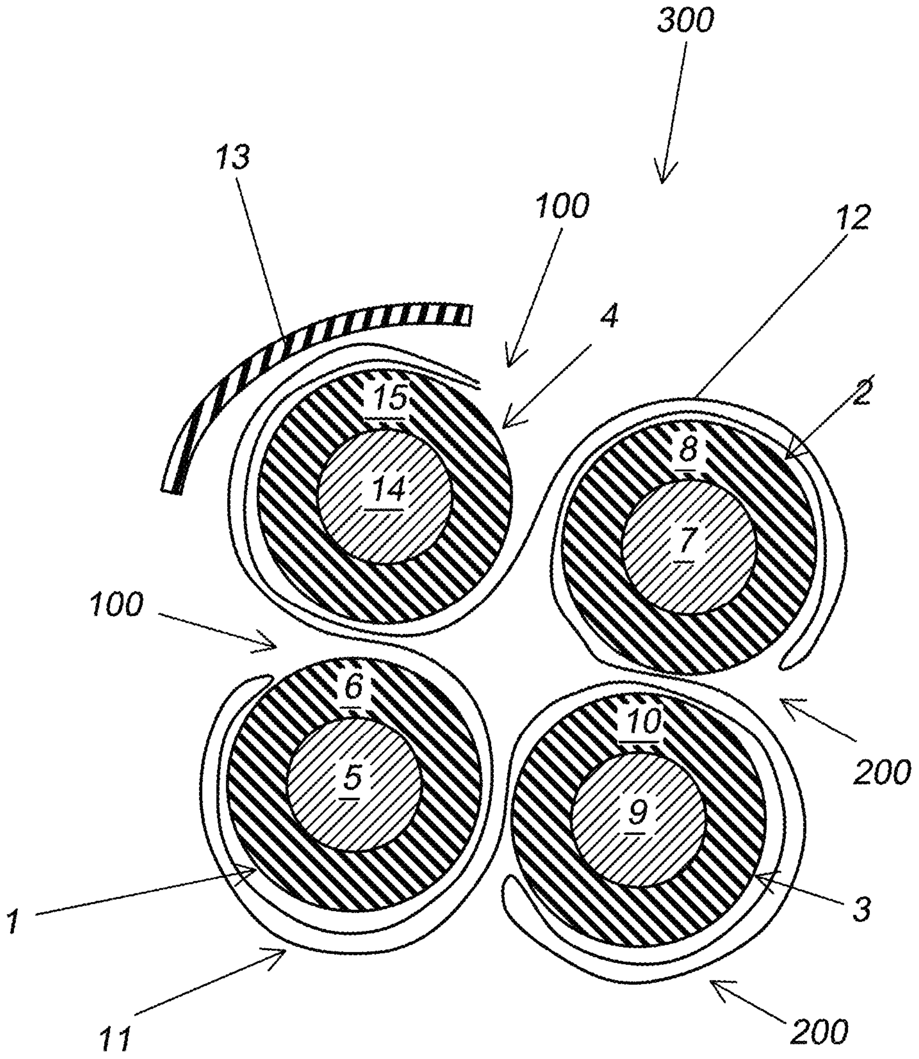
FIG. 1 schematically shows an embodiment of a data transmission cable according to the present disclosure and comprising two cable pairs.

FIG. 1 schematically shows an example of a data transmission cable 300 comprising a first cable pair 100 and at least a second cable pair 200. The first cable pair 100 (hereinafter also referred to as “first pair”, for the sake of brevity) has a first insulated conductor 1 and second insulated conductor 4. In an embodiment, the insulated conductors of each pairs are circumferentially adjacent, thus different from pairs of a star quad cable.

The first insulated conductor 1 comprises a first conductor 5, e.g., a metal rod or metal stranded wires, surrounded by a first insulating layer 6. The first insulated conductor 1 is associated with a first group of parameters comprising: a first external diameter D1, e.g., the diameter of the first insulated conductor 1, a first inner diameter $d_1$, e.g., the outer diameter of the first conductor 5, and a first dielectric constant $\varepsilon_1$, e.g., the dielectric constant of the first insulating layer 6. The second insulated conductor 4 comprises a second conductor 14, e.g., a metal rod or metal stranded wires, surrounded by a second insulating layer 15.

The first insulated conductor 1 and the second insulated conductor 4 form a balanced untwisted pair since they, in some implementations, have substantially identical impedances along their lengths and substantially identical impedances to ground and to other circuits. The second insulated conductor 4 of the first pair 100 has a respective group of parameters having values substantially identical to those of the first group of parameters of the first insulated conductor 1, e.g., D1, d1, $\varepsilon_1$.

In the present description and claims the term “substantially identical” (and the symbol ≈ denoting this term) refers to a parameter value of one insulated conductor being the same of the respective parameter value of another insulated conductor or having a difference from one another of a magnitude not greater than typical manufacturing or standard tolerances.

The second cable pair 200 (hereinafter also called “second pair”) has a third insulated conductor 3 and a fourth insulated conductor 2. The third insulated conductor 3 comprises a third conductor 9, e.g., a metal rod or metal stranded wires, surrounded by a third insulating layer 10. The third insulated conductor 3 is associated with a second group of parameters comprising: a second external diameter D3, e.g., the diameter of the third insulated conductor 3, a second inner diameter d3, e.g., the outer diameter of the third conductor 9, and a second dielectric constant 63, e.g., the dielectric constant of the third insulating layer 10. The fourth insulated conductor 2 comprises a third conductor 7, e.g., a metal rod or metal stranded wires, surrounded by a third insulating layer 8.

The third insulated conductor 3 and the fourth insulated conductor 2 form a balanced untwisted pair. The fourth insulated conductor 2 has a respective group of parameters having the values substantially identical to those of the second group of parameters of the third insulated conductor 3 (D3, d3, $\varepsilon_3$).

The first pair 100 and the second pair 200 are unbalanced with respect to each other in that each insulated conductor 1, 4 of the first pair 100 is unbalanced with respect to each insulated conductor 3, 2 of the second pair 200. In some implementations, each insulated conductor 1, 4 have impedances with respect to ground substantially identical to the impedances of insulated conductor 3, 2, but different signal propagation speed. It is observed that the mutual unbalanced status between first pair 100 and the second pair 200 allows decoupling the first pair 100 from the second pair 200 by different velocities of propagation.

The first group of parameters D1, d1, $\varepsilon_1$ associated with the first insulated conductor 1 and the second insulated conductor 4 has at least one value different from the respective value of the second group of parameters D3, d3, $\varepsilon_3$ associated with the third insulated conductor 3 and the fourth insulated conductor 2. For example, at least the first inner diameter $d_1$ of the first group has a value different from the second inner diameter $d_3$ of the second group.

Each insulated conductor of the first cable pair 100 and the second cable pair 200 is separated from the other insulated conductors by a metallic screen 11. The metallic screen 11 electromagnetically decouples each insulated conductor 1-4 from the other ones. The metallic screen 11 wraps around each insulated conductor 1-4. The metallic screen may be made of a single metallic foil or of a plurality of metallic foils of, for example, copper, aluminium or a laminate of copper/ or aluminium/polymer.

In an embodiment, the metallic screen 11 comprises a single metal foil 12 longitudinally arranged, by turnings and plies, in two layers at least partially wrapping the insulated conductors 1-4. Each of the first 1, the second 2, the third 3 and the fourth 4 insulated conductors is at least partially surrounded by the two layers of the metallic foil 12 which isolates each insulated conductor 1-4 from the others.

In another non illustrated embodiment, the metal screen can comprise two or more metal foils longitudinally arranged, by turnings and plies, in two or more layers at least partially wrapping the insulated conductors 1-4. A similar provision is illustrated, for example, in U.S. Pat. No. 6,288, 340.

In an embodiment, the metal screen is made of at least one metallic foil having a thickness of 3 to 100 μm, for example from 9 to 50 μm.

While the insulated conductors forming each pair 100, 200 are not twisted with one another, e.g., the first insulated conductor 1 is not twisted with the second insulated conductor 4, and the third 3 is not twisted with the fourth 2 insulated conductors, the insulated conductors 1, 4, 3 and 2 are stranded altogether.

Data transmission cable 300 also comprises an outer sheath 13 surrounding the first pair 100, the second pair 200 and the metallic foil 12. The sheath 13 can be made of a polymeric material, for example polyethylene, the polymer material optionally being a halogen-free and flame-retardant (HFFR) one.

Figure 2:
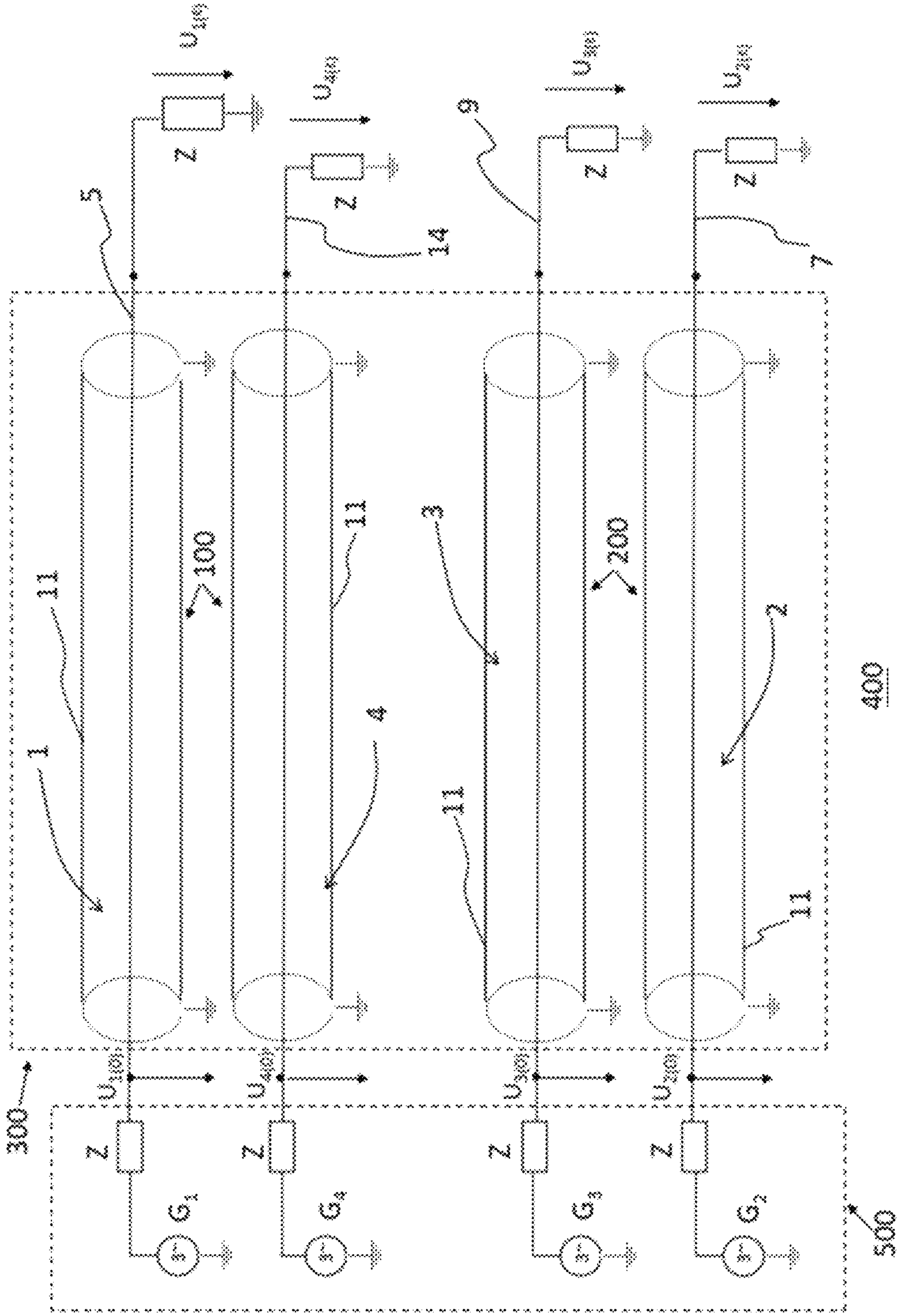
FIG. 2 schematically shows an example a data transmission system comprising a data transmission cable according to the present disclosure.

FIG. 2 schematically shows an example of a data transmission system 400 including the data transmission cable 300 described herein. The data transmission system 400 (hereinafter, "transmission system") is configured such that each first and second cable pair 100, 200 operates simultaneously according to a differential mode and a common mode. The construction of the insulated conductors of the pairs allows keeping the parameters of both mode under control and limiting the crosstalk between the pairs.

The transmission system 400 includes a communication device 500 connected to the data transmission cable 300 and configured to perform processing (such as an example: modulation, demodulation, packet encapsulation etc.) necessary for the transmission and the reception of data to/from the data transmission cable 300. Particularly, the transmission system 400 can operate according to the ethernet protocol.

According to an example (FIG. 2), the communication device 500 includes a first signal generator G1 associated with an impedance Z which, in the present example, is similar to the nominal impedance of the screened insulated conductor 1. Signal generator G1 is connected to the screened insulated conductor 1 at the near end of the cable 300 where the location x=0. A second signal generator G4 is also associated with an impedance Z and connected to the second screened insulated conductor 4 at the near end of the cable 300.

The two screened insulated conductors 1 and 4 are working together as a pair 100 as the signal generators G1 and G4 operate in a way that both modes of the pair 100 are excited simultaneously. Both modes are used simultaneously for data transmission and the data transmission is possible in both forward and backward direction simultaneously (full duplex). The metallic screens 11 (e.g., made as described with reference to FIG. 1) of the insulated conductors 1 and 4 are connected to ground.

Moreover, the communication device 500 includes, in the present example, two further signal generators G3 and G2 each associated with an impedance Z which are connected to the screened insulated conductors 3 and 2 at the near end of the cable 300. These insulated conductors are working together as pair 200. The metallic screens 11 (e.g., made as described with reference to FIG. 1) of the insulated conductors 3 and 2 are connected to ground. Furthermore, the signal generators 3 and 2 run a similar data transmission scheme as described above for insulated conductors 1 and 4. In FIG. 2, the above described insulating layers 6, 15 of the first cable pair 100 and the insulating layers 8, 10 of the second cable pair 200 are not shown for the sake of clarity of the drawings.

As an example, each insulated conductor 1-4 has an impedance Z of about 50Ω in order to achieve a balanced impedance of about 100Ω for the first cable pair 100 operating as differential pair. According to this example, the common mode impedance is of about 25Ω.

The data transmission cable of the present disclosure can be configured to have a data rate greater than that of the ethernet cable of Category 8 without any further decrease of the maximum reach. Indeed, the first and second cable pair operating both according to the differential mode with a data rate (i.e. data transfer speed) of up to 40 Gbps, in a frequency range of up to 2 GHz, and according to the common mode with a data rate of up to 80 Gbps, in a frequency range of up to 2 GHz, may have a transmission reach be greater than 30 m also for 80 Gbps. In this way, the data transmission rate can be doubled without further decrease of the maximum transmission length.

In the data transmission cable of the present disclosure, the two insulated conductors forming a cable pair can be circumferentially adjacent as above described or, according to another embodiment, they can be radially adjacent. For example, the first insulated conductor 1 and the fourth insulated conductor 2 are radially adjacent to one another.

With reference to the number of cable pairs, according to implementations of the data transmission cable of the present disclosure, more than two cable pairs can be employed. For example, the data transmission cable may have four cable pairs, each additional pair differing from one or more of the first cable pair 100 or the second cable pairs 200 in the parameters. In some implementations, each cable pair has a respective group of parameters (Di, di, $\varepsilon_{1i}$) different from that of another cable pairs. Insulated conductors are disposed circumferentially one another.

In the following paragraphs crosstalk aspects in the data transmission cable 300 of FIGS. 1 and 2 are discussed.

The crosstalk between the first insulated conductor 1 of the first pair 100 with the third insulated conductor 3 of the second pair 200 is discussed hereinbelow.

Considering a voltage $U_0$ driving the first insulated conductor 1 at the beginning of the line (x=0), the voltages at opposite ends (x=0 and x=l) of the third insulated conductor 3 can be calculated according to the following equations:

$$U_3(0) = -\frac{R_k}{2Z}\frac{1-e^{-(\gamma_1+\gamma_3)l}}{\gamma_1+\gamma_3}U_0, \quad (1)$$

$$U_3(l) = \frac{R_k}{2Z}\frac{e^{-\gamma_1 l}-e^{-\gamma_3 l}}{\gamma_3-\gamma_1}U_0, \quad (2)$$

where:

Z is the impedance of the single insulated conductor (first insulated conductor 1 or third insulated conductor 3);

$R_k$ is the effective transfer impedance between single insulated conductors;

$\gamma_1$, $\gamma_3$ are the propagation constants of the insulated conductors 1 and 3, respectively.

The effective transfer impedance is introduced according to Kaden, H.: "*Wirbelströme und Schirmung in der Nachrichten-technik*"; Springer-Verlag, chapter L-4, 1959. Comparison of simulated and measurement data discussed in the above-mentioned Pfeiler, C., et al. shows that the use of the transfer impedance of a single insulated conductor is effective for calculating a good approximation of the effective transfer impedance.

The insulated conductors 1, 4 of the first pair 100 are configured to show similar values of the propagation constants, e.g., substantially identical to a first value $\gamma_1$, and the insulated conductors 3, 2 of the second pair 200 show similar values of the propagation constants, e.g., substantially identical to a second value $\gamma_3$ different from the first value $\gamma_1$. This choice contributes to reduce the crosstalk.

Moreover, it is noticed that the metallic foil 12 of the metal screen 11 at least partially surrounding each insulated conductor 1-4 as above described contributes to reduce the effective transfer impedance $R_k$ and so the crosstalk effect.

The crosstalk between the first cable pair 100 and the second cable pair 200 is discussed hereinbelow.

To drive in differential mode the first insulated conductor 1 and second insulated conductor 4 forming a balanced untwisted pair 100, the following respective voltages $U_1$ and $U_4$ are applied according to a differential mode:

$$U_1(0) = \frac{1}{2}U_0 \quad (3)$$

$$U_4(0) = -\frac{1}{2}U_0 \quad (4)$$

Also, insulated conductors 3 and 2, operating according to the differential mode, form the balanced untwisted pair 200. As the propagation constants of the first cable pair 100 are substantially identical ($\gamma_1 \approx \gamma_2$) and the propagation constants of the second cable pair 200 are substantially identical ($\gamma_3 \approx \gamma_4$), the crosstalk from the insulated conductors 1 and 4 of the first cable pair 100 to the insulated conductors 3 and 2 of the second cable pair 200 superposes in a way that $U_3$=0 and $U_2$=0. This is a positive effect for the data transmission cable 300.

The crosstalk between a common mode propagating in the first pair 100 with the common mode of the second pair 200 is discussed hereinbelow.

The operation of the first pair 100 in common mode results in the following voltages:

$$U_1(0)=U_0 \quad (5)$$

$$U_4(0)=U_0 \quad (6)$$

Assuming that $\gamma_1 \approx \gamma_2$ and $\gamma_3 \approx \gamma_4$, the interference voltages at insulated conductors 3 and 2 add up as indicated in the following equations:

$$U_3(0) = U_2(0) = -\frac{R_k}{Z}\frac{1-e^{-(\gamma_1+\gamma_3)l}}{\gamma_1+\gamma_3}U_0 \quad (7)$$

$$U_3(l) = U_2(l) = \frac{R_k}{Z}\frac{e^{-\gamma_1 l}-e^{-\gamma_3 l}}{\gamma_3-\gamma_1}U_0 \quad (8)$$

This effect is reduced choosing the propagation constants of insulated conductors 1 and 4 different from those of insulated conductors 3 and 2 to limit the common mode crosstalk.

Moreover, the metallic foil 12 at least partially surrounding each insulated conductor 1-4 allows reducing this type of crosstalk.

The design parameters that may influence characteristic impedance and propagation constants of the insulated conductors 1-4 are: inner diameter $d_i$ of the i-th cable, external diameter $D_i$ of the i-th cable and the effective dielectric constant $\varepsilon_i$, of the i-th insulation layer (in the present example, with i ranging from 1 to 4).

Defining the conductivity $\kappa_i$ of the conductor material, e.g., the material of conductors 5, 7, 9 and 14, and the conductivity $\kappa_a$ of the material of the metallic screen 11, the skin depth $\delta_i$ of the conductor and the skin depth $\delta_a$ of the metallic screen 11, can be calculated by the following equations:

$$\delta_i = \frac{1+j}{\sqrt{j2\pi f\mu_0\kappa_i}},\ \delta_a = \frac{1+j}{\sqrt{j2\pi f\mu_0\kappa_a}}, \quad (9)$$

where:

j is the imaginary unit, f is the frequency of the voltage signal applied and, $\mu_0$ is the permeability constant.

According to Kaden, H.: "*Wirbelströme und Schirmung in der Nachrichten-technik*"; Springer-Verlag, chapter L-3c, 1959 the frequency dependent resistance $R_i$ of the conductor (one of the conductors 5, 7, 9 and 14) is:

$$R_i = \frac{4}{\pi d\kappa_i}\left(\frac{d}{4\delta_i} + \frac{1}{4} + \frac{6}{32}\frac{\delta_i}{d}\right), \quad (10)$$

where d is the outer diameter of the conductor.

For sufficiently high frequencies, e.g., of at least 5 MHz, and using the thickness s of the metallic foil 12, the frequency dependent resistance $R_a$ of said metallic foil 12 is:

$$R_a = \frac{1}{\pi D d \kappa_i} \frac{s}{\delta_a}, \tag{11}$$

where s is the thickness of the metallic foil portion surrounding an insulated conductor, which, in view of the metallic foil thickness, is substantially similar to the outer diameter of the insulated conductor; and D is the outer diameter of the insulated conductor that can be used as an approximation of the diameter of the metallic layer of the screening tape that is formed around an insulated conductor. Only the metallic layer closest to the insulated conductor is to be considered.

To calculate the propagation constants, the inductance Li and capacitance $C_i$ can be calculated as:

$$L_i = \frac{\mu_0}{2\pi} \ln\left(\frac{D_i}{d_i}\right) \tag{12}$$

$$C_i = \frac{2\pi\varepsilon_{ri}\varepsilon_0}{\ln\left(\frac{D_i}{d_i}\right)}, \tag{13}$$

where:

$\varepsilon_0$ is the permittivity constant;

$\varepsilon_{ri}$ is the relative permittivity constant of the material of the i-th insulating layer, which can be dependent on the foaming rate in case a foamed dielectric is used;

d is the outer diameter of the conductor; and

D is the outer diameter of the insulated conductor.

Using these primary parameters and assuming dielectric losses can be neglected, the secondary transmission line parameters (characteristic impedance Z and propagation constant $\gamma$) can be calculated as:

$$Z = \sqrt{\frac{R_i + R_a + j2\pi fL}{j2\pi fC}} \tag{14}$$

$$\gamma = \sqrt{(R_i + R_a + j2\pi fL)j2\pi fC} \tag{15}$$

The parameters $d_i$, $D_i$ and $\varepsilon_i$ can be selected individually per insulated conductor 1-4. As already discussed, it can be assumed that for those insulated conductors 1-4 which form a balanced untwisted pair, these parameters are identical.

For high frequencies the characteristic impedance can be approximated as $Z=\sqrt{L/C}$. In order to achieve the same level of characteristic impedance for all 1-4 (comprising the metal foil 12 at least partially surrounding them) the capacitance of the insulated conductor i has to be set to $C_i=L_i(C_1/L_1)$ and can therefore be derived from the geometry parameters $d_i$, $D_i$ and $\varepsilon_i$.

As described in the above-mentioned Kaden, H., Chapter L.3.c, the transfer impedance $Z_T$ of each portion of metallic foil 12 surrounding one insulated conductor 1-4 (from an electrical point of view, the foil 12 can be considered individually) can be calculated from the geometry. This value of the transfer impedance $Z_T$ can be used as an approximation of the effective transfer impedance $R_k$ as per equation 1:

$$R_k = R_a\left(\frac{1}{\sin^2\alpha} + \frac{jDd}{\delta_a^2 \tan^2\alpha}\right), \tag{16}$$

where:

$R_a$ is the DC resistance of the foil 12;

g is the lay length of the twisting of the four conductors together (length of cable in which the twisted conductors complete one turn around the cable axis);

$\alpha=\arctan(g/\pi D)$ is the lay angle twisting of the four conductors together;

$r_i=d_i/2$, wherein d is the diameter of the insulated conductor.

Figure 3:
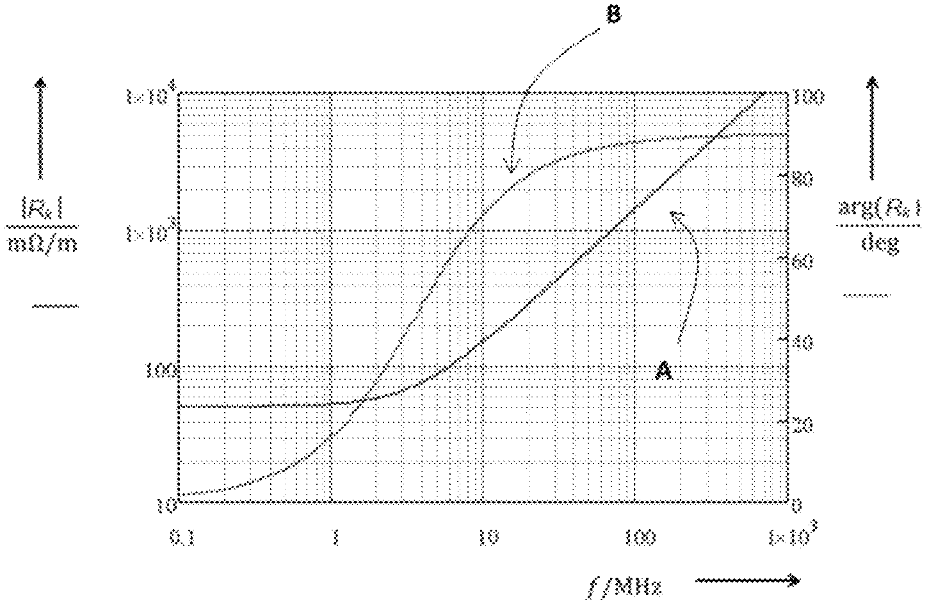
FIG. 3 shows two exemplary trends of amplitude and phase of a transfer impedance between parts of the metallic screen around insulated conductors of a data transmission cable according to the present disclosure.

As an example, FIG. 3 relates to equation (16) and shows the trend A representing the amplitude $|R_k|$ of the transfer impedance $R_k$ (measured in mΩ/m) versus frequency f (expressed in MHz) and the trend B representing the phase $\arg(R_T)$ of the transfer impedance $R_k$ (expressed in degrees), versus the frequency f.

As an example, from FIG. 3 the following parameters of a cylindrical screening foil 11 can be obtained:

D=3.0 mm, b=15 mm, s=50 mm, d=0.04 mm $\kappa$=35.106 Sm/mm$^2$ (conductivity of aluminium).

Figure 4:
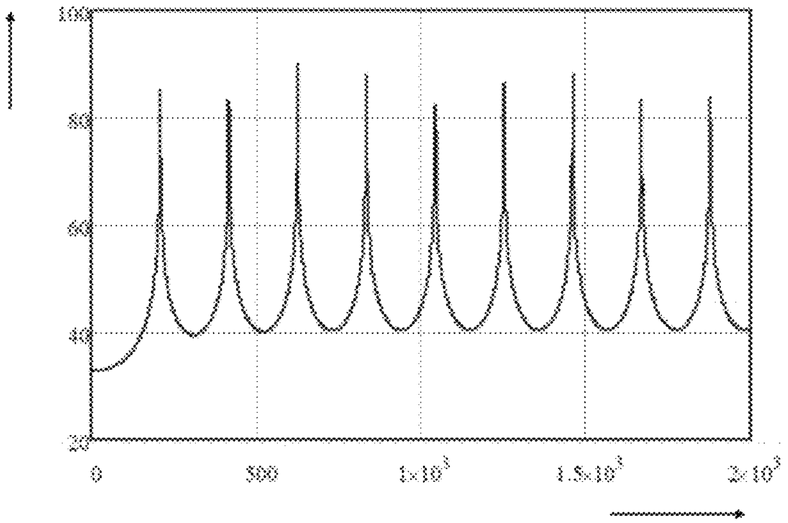
FIG. 4 shows an exemplary behaviour of Attenuation Crosstalk Ratio Far-end (ACR-F; in abscissa) versus the frequency (in MHz; in ordinate) in a data transmission cable according to the present disclosure.

Using the above described equations, a model to calculate the crosstalk between the insulated conductors 1-4 surrounded by the foil 12 can be obtained. Particularly, the far-end crosstalk according to equation (8) can be evaluated. Far-end crosstalk (ACR-F) is typically expressed in dB and is derived by subtracting the insertion loss (attenuation) of the disturbing pair from the Far End Crosstalk (FEXT) this pair induces in an adjacent pair. FIG. 4 shows an example for the frequency response of the calculated ACR-F. At present, a preferred value for the ACR-F (the described plateau value) of Cat8 cables is 20 dB at the centre frequency of the transmitting signal.

The difference of the velocity of propagation (i.e., the skew) of the two cable pairs 100 and 200 can be related to the resulting ACR-F. Table 1 shows the respective values where the frequency independent plateau value of the ACR-F is used. According to the needs of the possible transmission scheme the necessary ACR-F can be realised by choosing the respective geometry parameters.

TABLE 1

Table 1: Evaluation of the calculation model for ACR-F versus skew

| | Skew [ns/100 m] | | | |
|---|---|---|---|---|
| | 1 | 3.5 | 7 | 16 |
| ACR-F [dB] | 15 | 25 | 30 | 40 |
| $d_1$ [mm] | 0.560 | 0.560 | 0.560 | 0.560 |
| $D_1$ [mm] | 1.60 | 1.60 | 1.60 | 1.60 |
| $\varepsilon r_1$ | 1.60 | 1.60 | 1.60 | 1.60 |
| $d_2$ [mm] | 0.559 | 0.555 | 0.555 | 0.555 |
| $D_2$ [mm] | 1.60 | 1.60 | 1.61 | 1.65 |

The following ranges of parameters could be suitable for an effective transmission cable:

d: 0.40 mm to 0.67 mm

D: 1.0 mm to 1.8 mm $\varepsilon_{ri}$: 1.4 to 2.3.

The described data transmission cable and system allow increasing data rate by employing both the common and differential mode at the same time (i.e., simultaneously) for data transmission, without reducing the maximum cable distance, since crosstalk effects are limited thanks to the cable design.

The invention claimed is:

1. Data transmission cable comprising:

a first balanced untwisted cable pair including a first insulated conductor and a second insulated conductor, the first insulated conductor including a first conductor surrounded by a first insulation layer, and the second insulated conductor including a second conductor surrounded by a second insulation layer;

at least one second balanced untwisted cable pair including a third insulated conductor and a fourth insulated conductor, the third insulated conductor including a third conductor surrounded by a third insulation layer, and the fourth insulated conductor including a fourth conductor surrounded by a fourth insulation layer; and a metallic screen at least partially surrounding each of the first, second, third and fourth insulated conductor, wherein the metallic screen separates each of the first, second, third or fourth insulated conductor from one another, and wherein the first balanced untwisted cable pair and the second balanced untwisted cable pair are unbalanced with respect to one another.

2. Data transmission cable according to claim 1, wherein:

the first balanced untwisted cable pair is associated with a first group of structural parameters; and the second balanced untwisted cable pair is associated with a second group of structural parameters different from the first group of structural parameters in at least one parameter value.

3. Data transmission cable according to claim 2, wherein:

the first group of parameters includes: a first external diameter of the first or the second insulated conductor; a first inner diameter of the first or the second insulated conductor and a first dielectric constant of the first or the second insulation layers; and the second group of parameters includes: a second external diameter of the third or the fourth insulated conductor; a second inner diameter of the third or the fourth insulated conductor and a second dielectric constant of the third or the fourth insulation layer.

4. Data transmission cable according to claim 1, wherein the first insulated conductor, the second insulated conductor, the third insulated conductor and the fourth insulated conductor are stranded altogether.

5. Data transmission cable according to claim 1, further including an outer sheath surrounding the first balanced untwisted cable pair, the at least one second pair, and the metallic screen.

6. Data transmission cable according to claim 1, wherein the metallic screen comprises at least one metallic foil.

7. Data transmission cable according to claim 6, wherein the metallic foil is of a material selected from copper, aluminium, or alloys thereof.

8. Data transmission cable according to claim 1, wherein the metallic screen comprises two or more metallic foils, the two or more metallic foils being partially radially superposed over one another.

9. Data transmission cable according to claim 1, wherein the data transmission cable is configured to operate according to an ethernet protocol.

10. Data transmission system comprising:

a data transmission cable; and a communication device connected to the data transmission cable, and configured to generate and transmit along the data transmission cable data signals in common mode and differential mode simultaneously, wherein the data transmission cable comprising:

a first balanced untwisted cable pair including: a first insulated conductor and a second insulated conductor, the first insulated conductor including a first conductor surrounded by a first insulation layer, and the second insulated conductor including a second conductor surrounded by a second insulation layer;

at least a second balanced untwisted cable pair including: a third insulated conductor and a fourth insulated conductor, the third insulated conductor including a third conductor surrounded by a third insulation layer, and the fourth insulated conductor including a fourth conductor surrounded by a fourth insulation layer; and a metallic screen at least partially surrounding each of the first, second, third and fourth insulated conductor, the metallic screen separating each of the first, second, third or fourth insulated conductor from one another, and wherein the first balanced untwisted cable pair and the second balanced cable pair are unbalanced with respect to one another.

* * * * *